United States Patent [19]

Allison, III

[11] 4,314,926

[45] Feb. 9, 1982

[54] HOT MELT ADHESIVE AND ADDITIVE THEREFORE

[75] Inventor: George M. Allison, III, Bartlesville, Okla.

[73] Assignee: Phillips Petroleum Company, Bartlesville, Okla.

[21] Appl. No.: 148,878

[22] Filed: May 12, 1980

[51] Int. Cl.³ .......................... C08K 5/01; C08L 53/00
[52] U.S. Cl. ................... 260/33.6 AQ; 260/33.6 UA; 525/93; 525/95; 525/132
[58] Field of Search ........................... 525/93, 132, 95; 260/33.6, 33.6 AQ, 33.6 UA

[56] References Cited

U.S. PATENT DOCUMENTS

| Re. 28,236 | 11/1974 | Hendricks et al. | 36/32 R |
| 3,383,435 | 5/1968 | Cizek | 525/133 |
| 4,104,323 | 8/1978 | Hansen | 260/33.6 AQ |

Primary Examiner—J. Ziegler

[57] ABSTRACT

The holding power of hot melt adhesives is increased by the addition of poly(alpha-methylstyrene) and polyphenylene oxide.

8 Claims, No Drawings

HOT MELT ADHESIVE AND ADDITIVE THEREFORE

This invention relates to polymer based hot melt adhesives and more specifically to additives for those adhesives which enhance the adhesive holding power.

BACKGROUND OF THE INVENTION

Many adhesive formulations have been described in the art. Among the adhesives described are hot melt adhesives. Known adhesives contain copolymers such as hydrogenated butadiene-styrene copolymers, modifying agents for these copolymers, plasticizers and other additives. There is a continuing need in the art to improve the holding power of pressure sensitive adhesives, and in particular those employed as hot melts. These adhesives have a wide range of application varying from masking tapes and labels to construction materials and the automotive industry. Increasing the service temperature or adhesive strength (holding power) for a particular type of adhesive generally enlarges the adhesive's application area. During the past several years conjugated diene/monovinyl aromatic block copolymers have been used as the basic ingredient in some hot melt adhesive compositions. To increase the use or service temperature of these and other similar compositions, polymers such as polyphenylene oxide known to have good thermal stability, have been added. U.S. Pat. No. 4,104,323 describes a hot melt adhesive based on a conjugated diene block copolymer, having therein polyphenylene oxide resins to give improved high temperature properties. Also incorporated therein are materials referred to as tackifiers (modifying agents) that are compatible with either the polyconjugated diene portion of the base copolymer or with the polyvinylaromatic portion of the base copolymer.

THE INVENTION

It is thus one object of this invention to improve hot melt adhesives in their holding power.

Another object of this invention is to provide a new additive for a hot melt adhesive which increases the holding power thereof.

Yet a further object of this invention is to provide a structure wherein two elements are connected by means of an adhesive layer and the binding strength between the elements is enlarged as compared to similar adhesives.

These and other objects, advantages, details, features and embodiments of this invention will become apparent to those skilled in the art from the following description of the invention and the appended claims.

In accordance with this invention it has now been found that hot melt adhesives can be improved in their holding power by an additive which comprises polyphenylene oxide and poly(alpha-methylstyrene). In accordance with a first embodiment of this invention there is provided a hot melt adhesive comprising a conjugated diene/monovinyl aromatic copolymer, a modifying agent compatible with the polyconjugated diene segment of said copolymer, optionally a modifying agent compatible with the polyvinylaromatic segment of said copolymer, optionally a plasticizer or flexibilizer, and in accordance with this invention polyphenylene oxide and poly(alpha-methylstyrene). If the copolymer utilized is a hydrogenated copolymer, it is necessary that a plasticizer or flexibilizer is present in the adhesive of this invention.

In accordance with another embodiment of this invention, an additive for an adhesive is provided which contains 25-75 parts by weight of poly(alpha-methylstyrene) and 5-30 parts by weight of polyphenylene oxide. In this additive the preferred weight ratio of poly(alpha-methylstyrene) to polyphenylene oxide is in the range of about 1:1 to about 10:1.

In accordance with a yet further embodiment of this invention a laminated structure is provided which comprises at least three elements, namely a first solid element and a second solid element and an adhesive layer between the first and the second element, the adhesive layer being defined as above. Among the surfaces of the first and second elements connected via the adhesive layer are metals, plastics, ceramics, wood and glass. The plastics when utilized have to be compatible with the adhesive composition, and in particular have to be insoluble in the adhesive ingredients. Furthermore, the softening point and the melting point of the plastic material should be well above the temperature of use of the adhesive. This temperture of use is generally in the range of about $-20°$ to about $180°$ F.

CONJUGATED DIENE/MONOVINYL AROMATIC COPOLYMERS

Conjugated diene/monovinyl aromatic copolymers useful in this invention are those materials represented by the formulas

$$A\!-\!B\!-\!A \tag{I}$$

and

$$(A\!-\!B)_x Y \tag{II}$$

wherein A is a non-elastomeric monovinyl arene block, B is an elastomeric hydrogenated or non-hydrogenated conjugated diene block, Y is an atom or group of atoms and can e.g. be derived from a polyfunctional treating agent used in the coupling formation of branched or radial polymers, or be derived from a polyfunctional initiator, and x is an integer of at least 3 and can be equal to the number of functional groups of said polyfunctional agent. The monovinyl arene monomers used in the said block polymer non-elastomeric segments include those having 8 to 16 carbon atoms. Suitable examples include styrene, 3-methylstyrene, 4-n-propylstyrene, 4-p-tolylstyrene, 1-vinylnaphthalene, 2-vinylnaphthalene. The conjugated diene monomers used in the said block polymer elastomeric segments are those compounds which contain 4 to 8 carbon atoms. Examples of such compounds include 1,3-butadiene, isoprene, 2,3-dimethyl-1,3-butadiene, piperylene, 3-butyl-1,3-octadiene, and 1-phenyl-1,3-butadiene.

A general description of the preparation of the copolymers represented by formula I is contained in U.S. Pat. No. 3,239,478. A general description of the preparation of the copolymers represented by formula II is contained in U.S. Pat. No. 3,281,383.

The hydrogenated conjugated diene/monovinyl aromatic copolymers are preferred in this invention. The hydrogenation of the conjugated diene/monovinyl aromatic copolymers can be conducted by any common method known to work with these polymers. Materials such as nickel on kieselguhr, Raney nickel, and palladium are suitable hydrogenation catalysts. U.S. Pat. No.

3,554,911 is cited as exemplary for the preparation of a hydrogenated butadiene/styrene copolymer. The conjugated diene/monovinyl aromatic weight ratio in the above mentioned copolymers can be broadly from 60/40 to 90/10, preferably from 65/35 to 85/15. The weight average molecular weight ($M_w$) of the preferred copolymers will depend on whether or not the copolymer has been hydrogenated. For example

|  | $M_w$, Broadly | $M_w$, Preferred |
|---|---|---|
| Saturated (Hydrogenated) | 60,000–160,000 | 80,000–120,000 |
| Unsaturated (Non-Hydrogenated) | 100,000–300,000 | 130,000–200,000 |

MODIFYING AGENTS

There are two kinds of modifying agents (tackifiers) useful in this invention, those considered more compatible with the polyconjugated diene portion of the above mentioned copolymer which are labeled herein as Modifying Agent X and those considered more compatible with the polymonovinyl aromatic portion of the above mentioned copolymer which are labeled herein as Modifying Agent Y. The preparations of these materials are well known in the art. Typical Modifying Agents X can be for example but not limited to such class of commercially available compositions as

| Polyolefins | (e.g. Wingtack$^R$95) |
|---|---|
| Polymerized mixed olefins | (e.g. Super StaTac$^R$) |
| Mixed esters of polymerized rosin | (e.g. Polypale$^R$) |
| Glycerol esters of rosin | (e.g. Foral$^R$85) |
| Pentaerythritol ester of rosin | (e.g. Pentalyn$^R$H) |
| Polydipentene | (e.g. Zonarez$^R$7115) |
| Polyterpenes | (e.g. CRJ$^R$-683) |

Typical Modifying Agents Y can be for example but not limited to such class of commercially available compositions

| Vinyltoluene/α - Methylstyrene Copolymers | (e.g. Piccotex$^R$120) |
|---|---|
| Coumarone-Indene Resins | (e.g. Cumar$^R$LX-509) |
| Aromatic Resins and mixtures thereof. | (e.g. Picco$^R$410) |

FLEXIBILIZERS/PLASTICIZERS

Flexibilizers/Plasticizers useful in this invention are also referred to as extender oils. Any type extender oil is useful herein providing it is either paraffinic or naphthenic in composition. Aromatic oils can not be used herein because they tend to solubilize the polymonovinyl aromatic segment of the conjugated diene/monovinyl aromatic copolymer employed. The extender oil must be used with hydrogenated copolymers, and it may be used with unhydrogenated copolymers, too.

STABILIZERS

Stabilizers used herein can be any compound or mixture of compounds known to exhibit antioxidant characteristics. Such compounds can be for example but not limited to materials such as hindered phenols, amines, metal dialkyldithiocarbamates, thioesters, etc.

POLY(ALPHA-METHYLSTYRENE)

Poly(alpha-methylstyrene) when blended with polyphenylene oxide contributes to the large increase in adhesive holding power of the hot melt adhesive described herein. The poly(alpha-methylstyrene) employed herein can be any poly(alpha-methylstyrene) homopolymer having a ring and ball softening point of from about 85° C. (185° F.) to about 150° C. (302° F.) as determined by test method ASTM D 36. The specific poly(alpha-methylstyrene) employed herein, Kristalex ®1120 from Hercules, has the following properties which can serve to further characterize these polymers. Other poly(alpha-methylstyrene) homopolymers having properties near or equal to those for Kristalex 1120 are within the scope of this invention. These properties are:

| Softening Point, R&B, °C. | 120 |
|---|---|
| Color, Gardner | 1 |
| Acid Number | 1 |
| Saponification Number | 1 |
| Bromine Number | 3 |
| Specific Gravity at 25° C. | 1.06 |
| Flash Point | 455° F. (235° C.) |
| Melt Viscosity, °C. | |
| 1 poise at 220° C. | |
| 10 poise at 185° C. | |
| 100 poise at 154° C. | |

Poly(alpha-methylstyrene) can be prepared by any known method. One such method is described in "Preparation Methods of Polymer Chemistry," by W. R. Sorenson and T. W. Campbell, Interscience Publishers, Inc., 1961 wherein alpha-methylstyrene is diluted with ethyl chloride and treated at about −130° C. with a 1 wt. % solution of anhydrous aluminum chloride in ethyl chloride.

POLYPHENYLENE OXIDE

The polyphenylene oxide resins useful in this invention have the repeating structural unit of the general formula

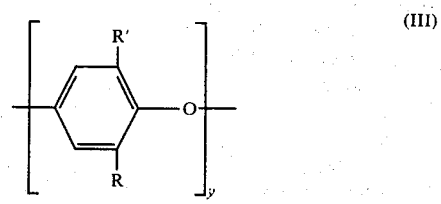

(III)

wherein the oxygen atom of one repeating unit is connected to the phenylene nucleus of the next repeating unit, R is a monovalent substituent selected from the group consisting of hydrogen, hydrocarbon radicals free of a tertiary α-carbon atoms, halohydrocarbon radicals having at least two carbon atoms between the halogen atom and phenol nucleus and free of a tertiary α-carbon atoms, and halohydrocarbonoxy radicals having at least two carbon atoms between the halogen atom and phenol nucleus and being free of a tertiary α-carbon atom; R' is the same as R and may additionally be a halogen; and y may represent an integer greater than 100. The polyphenylene oxide in this invention can have a weight average molecular weight of broadly 10,000 to 100,000, preferably 15,000 to 50,000.

Examples and preparations of polyphenylene oxides corresponding to formula III above can be found in U.S. Pat. Nos. 3,306,874; 3,306,875; 3,257,357; and 3,257,358. For example, U.S. Pat. Nos. 3,306,874 and 3,306,875 describe the preparation by an oxidative coupling reaction comprising passing an oxygen-containing gas through a reaction solution of a phenol and a metal amine complex catalyst.

HOT MELT ADHESIVE COMPOSITION

The previously described hot melt adhesive ingredients can be combined in any manner preferred by those skilled in the art to give a satisfactory hot melt adhesive composition. The weight ranges for these ingredients are given in Table I.

TABLE I

Hot Melt Adhesive Composition Operating Ranges

| Ingredients | Parts by Weight Broadly | Preferred |
|---|---|---|
| Bd/Sty Copolymer | 100 | 100 |
| Polyconjugated Diene Segment Modifying Agent X | 50–250 | 75–200 |
| Polyvinyl Aromatic Segment Modifying Agent Y | 0–100 | 25–75 |
| Plasticizer/Flexibilizer (Extender Oil) | | |
| When hydrogenated copolymer used, | 50–150 | 75–125 |
| When unhydrogenated copolymer used, | 0–125 | 25–100 |
| Usually employed additives: Antioxidant | 0.1–10 | 1–5 |
| Thermal Stabilizer | 0.01–1 | 0.1–0.5 |
| Inventive Blend: | | |
| Poly(alpha-methylstyrene) | 1–100 | 25–75 |
| Polyphenylene Oxide | 1–50 | 5–30 |

The following examples are intended to illustrate the invention without undue limitation of its scope.

EXAMPLE I

This example illustrates the method of formulating and testing the hot melt adhesives described herein. In addition, the example serves as a control illustrating performance properties of a basic hot melt adhesive system that does not contain the two inventive components disclosed herein. Into a flask was charged the following formulation

| Parts | Ingredient |
|---|---|
| 100 | Rubbery Butadiene/Styrene Copolymer[a] |
| 150 | Modifying Agent X[b] |
| 50 | Modifying Agent Y[c] |
| 100 | Naphthenic Oil[d] |
| 3 | Stabilizer Irganox 1076[e] |
| 0.3 | Stabilizer, Butyl Zimate[f] |
| 940 | Toluene Solvent |

[a]Hydrogenated linear-radial block mixture of 70 wt. % butadiene/30 wt. % styrene copolymer, $M_w$ 65,000/$M_n$ 56,000; degree of coupling 2.5; 34% original vinyl unsaturation.
[b]Wingtack 95, a diene-olefin resin from Goodyear, softening point 95° C., prepared by cationic polymerization of piperylene, isoprene, cyclopentadiene, 2-methylbutene (SA Pat. No. 700,881).
[c]Piccotex 120, an alpha-methylstyrene-vinyltoluene copolymer from Hercules having a ring and ball softening point of 120° C. and a Tg of about 49° C.
[d]Tufflo 6204 from Arco Chemical Co.
[e]Octadecyl beta(3,5-di-t-butyl-4-hydroxyphenyl)propionate from Ciba-Geigy.
[f]Zinc dibutyldithiocarbamate from R.T. Vanderbilt.

The flask with the formulation was placed on a steam bath until contents dissolved. The contents were then diluted with about 650 parts of distilled water and a steam tube was inserted to within about 0.5 inches from the bottom of the flask to strip off the solvent. After all the solvent was removed, the adhesive was vacuum-dried (10–20 Torr Hg) at 100° C. (212° F.) for about 16 hours. Melt viscosity was measured at 177° C. (350° F.) and 204° C. (400° F.) using a Brookfield Thermosel viscometer equipped with a number 4-27 spindle. Three pressure sensitive adhesive properties were determined on the formulations, namely, holding power, probe tack and rolling ball.

Holding power was measured at 80° C. according to the Pressure Sensitive Tape Council's test method PSTC-7 that consists of overlapping one inch of a one inch wide adhesive coated 2-mil Mylar film strip onto a stainless steel plate, and then after conditioning imposing a two pound continuous load on the specimen in a direction coaxial to the length of the adhesive coated Mylar film and measuring the time required for the specimen to move 0.0625 inches (0.159 cm).

Probe tack was measured by means of a 0.0625 inch (0.159 cm) diameter polished stainless steel probe, ASTM 221 (64) 1957, in a "Polyken" probe tack tester, the probe being adhered to the adhesive by a static weight of 100 grams/cm² for 1 second and removed at a rate of 0.5 cm/second. High tack adhesives have probe tack values greater than about 1000 grams.

Rolling ball was measured according to the test method PSTC-6 which involves a stainless steel ball rolling down an inclined plane onto the surface of a pressure sensitive adhesive layer deposited on a horizontal plane, and measuring the distance in inches, the ball rolls across the adhesive. High tack adhesives generally stop the ball within 0.5 to 3 inches whereas low tack adhesives will allow the ball to roll more than 12 inches.

The adhesive properties measured on the adhesive formulation described in this example were:

| | |
|---|---|
| Melt Viscosity at 177° C., cps. | 500,000 |
| Melt Viscosity at 204° C., cps. | 14,250 |
| Holding Power at 80° C., 2 lb. wt., hours | 2 |
| Probe Tack, grams | 1,560 |
| Rolling Ball, inches | 0.8 |

EXAMPLE II

This example is a control illustrating the change in performance properties when only one of the two inventive compounds, namely poly(alpha-methylstyrene), is incorporated into the hot melt adhesive. The formulating and testing procedure described in Example I was repeated except 50 parts of a poly(alpha-methylstyrene) was added during the initial mixing of ingredients. The specific poly(alpha-methylstyrene) employed was Kristalex 1120 from Hercules characterized with a softening point of 120° C., specific gravity at 25° C. of 1.06, melt viscosity at 220° C. of 100 cps., 1000 cps. at 185° C., and 10,000 cps. at 154° C. The performance properties of this hot melt adhesive system were:

| | |
|---|---|
| Melt Viscosity at 177° C., cps. | — |
| Melt Viscosity at 204° C., cps. | 5,200 |
| Holding Power at 80° C., 2 lb. wt., hours | 3.4 |
| Probe Tack, grams | 1,458 |
| Rolling Ball, inches | 0.35 |

This example demonstrates a slight increase in holding power but a significant decrease in melt viscosity when a poly(alpha-methylstyrene) is added to the basic hot melt adhesive formulation. The tack properties are considered good.

EXAMPLE III

This example is a control illustrating the change in performance properties when only one of the two inventive compounds, namely, polyphenylene oxide, is incorporated into the hot melt adhesive. The formulating and testing procedure described in Example I was repeated except 10 parts of polyphenylene oxide (mol. wt. 26,000 from General Electric) was added during the initial mixing of ingredients. The performance properties listed below indicate a slight improvement in holding power, a high but not necessarily too high melt viscosity, and good tack properties when the polyphenylene oxide was present in the formulation.

| | |
|---|---|
| Melt Viscosity at 177° C., cps. | 500,000 |
| Melt Viscosity at 204° C., cps. | 51,500 |
| Holding Power at 80° C., 2 lbs. wt., hours | 4.2 |
| Probe Tack, grams | 1,560 |
| Rolling Ball, inches | 1.1 |

EXAMPLE IV

This example is the invention and illustrates that when both a poly(alpha-methylstyrene) and a polyphenylene oxide are present in the same basic hot melt formulation as herein described the strength of that adhesive (holding power) is greatly increased while continuing to maintain good adhesive tack properties. In addition, the melt viscosity of the newly formed adhesive is very satisfactory, being about midway between that when either the poly(alpha-methylstyrene) or polyphenylene oxide alone are incorporated in the basic hot melt adhesives. The formulating and testing procedure described in Example I was again repeated except 50 parts of poly(alpha-methylstyrene) (Kristalex 1120) and 10 grams of polyphenylene oxide (General Electric) were added during the initial mixing of ingredients. These results are listed in Table II along with those results obtained in previous examples for comparison.

TABLE II
Effects of Polyphenylene Oxide/Poly(alpha-methylstyrene) on Hot Melt Pressure Sensitive Adhesive Performance Properties

| | Example I | Example II | Example III | Example IV |
|---|---|---|---|---|
| 1. Formulation: | | | | |
| Hydrogenated 70 wt. % Butadiene/30 wt. % Styrene Copolymer | 100 | 100 | 100 | 100 |
| Wingtack 95 | 150 | 150 | 150 | 150 |
| Piccotex 120 | 50 | 50 | 50 | 50 |
| Napthenic Oil | 100 | 100 | 100 | 100 |
| Stabilizer, Irganox 1076 | 3 | 3 | 3 | 3 |
| Stabilizer, Butyl Zimate | 0.3 | 0.3 | 0.3 | 0.3 |
| Inventive Additives: | | | | |
| Poly(alpha-methylstyrene) | — | 50 | — | 50 |
| Polyphenylene Oxide | — | — | 10 | 10 |
| 2. Hot Melt Adhesive Properties: | | | | |
| a. Melt Viscosity at 177° C., cps. | >500,000 | >500,000 | >500,000 | >500,000 |
| Melt Viscosity at 204° C., cps. | 14,250 | 5,200 | 51,500 | 29,400 |
| b. Holding Power at 80° C., 2 lb. wt. hrs. | 2 | 3.4 | 4.2 | 60 |
| c. Probe Tack, grams | 1,560 | 1,458 | 1,560 | 1,444 |
| d. Rolling Ball, inches | 0.8 | 0.35 | 1.1 | 1.1 |

Reasonable variations and modifications which will become apparent to those skilled in the art can be made in this invention without departing from the spirit and scope thereof.

I claim:

1. Hot melt adhesive having improved holding power comprising
    (a) a conjugated diene/monovinyl aromatic copolymer component comprising at least one of
        (aa) non-hydrogenated conjugated diene/monovinyl aromatic copolymers,
        (bb) hydrogenated conjugated diene/monovinyl aromatic copolymers with extender oil,
    (b) a modifying agent compatible with the conjugated diene section of the copolymer,
    (c) poly(alpha-methylstyrene)
    (d) polyphenylene oxide.

2. Hot melt adhesive in accordance with claim 1 wherein said copolymer is a copolymer of one or more conjugated dienes having 4–8 carbon atoms per molecule and one or more monovinyl aromatic monomers having 8–16 carbon atoms per molecule.

3. Hot melt adhesive in accordance with claim 1 comprising the following ingredients:

| | Parts by Weight |
|---|---|
| Hydrogenated Copolymer | 100 |
| Polyconjugated Diene Segment Modifying Agent | 50–250 |
| Polyvinyl Aromatic Segment Modifying Agent | 0–100 |
| Extender Oil | 50–150 |
| Poly(alpha-methylstyrene) | 1–100 |
| Polyphenylene Oxide | 1–50 |

4. Hot melt adhesive in accordance with claim 1 comprising the following ingredients:

| | Parts by Weight |
|---|---|
| Non-hydrogenated Copolymer | 100 |
| Polyconjugated Diene Segment Modifying Agent | 50–250 |
| Polyvinyl Aromatic Segment Modifying Agent | 0–100 |
| Extender Oil | 0–125 |
| Poly(alpha-methylstyrene) | 1–100 |
| Polyphenylene Oxide | 1–50 |

5. Hot melt adhesive in accordance with claim 1 wherein said copolymer has the structure A—B—A or $(A-B)_x-Y$ wherein A is a non-elastomeric monovinyl arene block, B is an elastomeric conjugated diene block and Y is an atom or group of atoms derived from a polyfunctional coupling or initiating agent, and x is an integer of at least 3 and represents the number of functional groups of said polyfunctional agent.

6. A hot melt adhesive in accordance with claim 1 comprising a modifying agent compatible with a polyvinyl aromatic section of the copolymer.

7. A hot melt adhesive in accordance with claim 6 wherein the modifying agent which is compatible with the polyvinyl aromatic section of the copolymer is a vinyltoluene-alpha-methylstyrene copolymer.

8. A hot melt adhesive in accordance with claim 3 or 4 wherein the polyvinyl aromatic segment modifying agent is a vinyltoluene-alpha-methylstyrene copolymer.

* * * * *